United States Patent
Pozzo

[11] Patent Number: 5,899,252
[45] Date of Patent: May 4, 1999

[54] ROUTER BIT AND ROUTING METHOD

[75] Inventor: Piergiorgio Pozzo, Udine, Italy

[73] Assignee: Freud USA, Inc., High Point, N.C.

[21] Appl. No.: 08/896,578

[22] Filed: Jul. 18, 1997

[51] Int. Cl.[6] ........................................... B27M 1/00

[52] U.S. Cl. ................. 144/371; 144/135.2; 144/137; 144/228; 144/241; 144/253.2; 144/253.5

[58] Field of Search ..................... 409/181, 182; 144/134.1, 135.2, 137, 218, 228, 229, 241, 253.1, 253.2, 253.5, 371

[56] References Cited

U.S. PATENT DOCUMENTS

| | | | |
|---|---|---|---|
| 1,748,767 | 2/1930 | Heston et al. | 144/135.2 |
| 4,844,135 | 7/1989 | Witt | 144/135.2 |
| 5,615,918 | 4/1997 | Venditto | 144/135.2 |

OTHER PUBLICATIONS

Freud USA, Inc. General Products Catalog, "Straight, Spiral, & Trim Bits", 1996, p. 55.
Freud USA, Inc. Shaper Cutter Catalog, "Raised Panel Cutters", p. 70.

*Primary Examiner*—W. Donald Bray
*Attorney, Agent, or Firm*—Kennedy, Covington, Lobdell & Hickman LLP

[57] ABSTRACT

A router bit and method for cutting predetermined configurations in a workpiece. The router bit includes a body portion having an axis of rotation, a radial extent about the axis, and a longitudinal extent, and a shank member includes a shank to be retained in the rotating machine, with the shank extending along the axis and being formed integrally with the body. A first pair of cutter elements are mounted on the body diametrically opposed to each other, and each of the first pair of cutter elements has a cutting edge which extends generally radially. A second pair of cutter elements is mounted on the body in generally diametrically opposed relation to each other and circumferentially spaced from the first pair of cutter elements, and each of the second pair of cutter elements has a cutting edge extending generally longitudinally. The first pair of cutter elements each have a hook angle and a positive shear angle, and the second pair of cutter elements each have a hook angle and shear angle in a range from zero to negative.

24 Claims, 5 Drawing Sheets

ROUTER BIT AND ROUTING METHOD

BACKGROUND OF THE INVENTION

The present invention relates generally to router bits for routing predetermined configurations in a workpiece and, more particularly, to a router bit which has two pairs of cutter elements for smoothly and precisely cutting the predetermined configurations while leaving a smooth surface.

Router bits have long been used for cutting various configurations, such as a bevel or straight-sided groove, in workpieces composed of wood or other appropriate materials. Router bits have also been used to cut more complicated configurations, such as those involved in forming a raised panel, as shown in Witt U.S. Pat. No. 4,844,1350. However, these complicated configurations typically require that cuts be made in a workpiece so as to form cut surfaces which have a varied angular and/or curved profile, with the profile extending both parallel to the major surface of the workpiece and also perpendicular to such surface. The "ooge" or S-shaped pattern is typical of such configurations formed in, among other components, raised panels.

Previous router bits have typically not been able to cut such complicated configurations so as to leave smooth and precisely formed cut surfaces. Moreover, when routing a raised panel edge on all four edges of a wooden panel, routing operations on two of the edges will typically involve the cutting of end grain. It has long been recognized that cutting of end grain presents particular challenges in that wood fibers in this orientation have the greatest ability to resist cutting, yet are likely to splinter, and the cutting of end grain is therefore ordinarily difficult at best.

Router bits are ordinarily mounted in a routing machine which has a rotational speed of approximately 8,000 to 24,000 rpm and a power most often in the range of approximately 1 to 3.25 horsepower. Router bits have relatively low mass, and the typically low horsepower of routing machines results in the router bits usually being driven with a relatively low torque.

The smooth cutting of complex configurations with shaper cutters, which are larger than router bits and ordinarily are driven with significantly higher horsepower and torque, has been assisted by the "2+2" Raised Panel Cutters of the assignee of the present application. These shaper cutters employ a pair of cutter elements which are essentially dedicated to cutting the portion of the raised panel configuration which extends along the axis of the cutter, or perpendicular to the major surface of the workpiece, and these cutters are mounted with a negative shear angle. However, the use of such an arrangement can increase the cutting resistance met by the cutter and has not been known to be used in router bits which are driven at a lower horsepower and lower torque. The less powerful routing machines, which are used by hobbyist woodworkers and small scale woodworking shops, are usually much less expensive than shaper cutters.

Consequently, a need therefore exists for a router bit which is capable of accurately cutting complicated configurations in a workpiece, while leaving smooth cut surfaces.

SUMMARY OF THE INVENTION

In accordance with the present invention, a router bit and method are provided for cutting predetermined configurations in a workpiece and to allow such configurations to be cut with the router bit while leaving a smooth cut surface on the workpiece. The benefits of the present invention are realized with a router bit that includes a body portion which has a axis of rotation, a radial extent about its axis, and an axial extent. The router bit also includes a shank which can be mounted for retaining engagement in a routing machine, and the shank extends generally along the axis and is formed integrally with the body portion.

A first pair of cutter elements is mounted on the body in generally diagrammatically opposed relation to each other, with each of the first pair of cutter elements having a cutting edge that extends generally radially for cutting a portion of the predetermined configuration. A second pair of cutter elements is also mounted on the body in generally diametrically opposed relation and is circumferentially spaced from the first pair of cutter elements, and each of the second pair of cutter elements has a cutting edge that extends generally axially for cutting a portion of the predetermined configuration. The first pair of cutter elements each has a hook angle and a positive shear angle for cutting their portion of the configuration, while the second pair of cutter elements each has a hook angle and a shear angle in a range from zero to negative for cutting the portion of the configuration corresponding to the second pair of cutter elements.

The generally axially extending cutting edge portions of the second pair of cutter elements may be positioned further radially outward than the first cutter elements, so that the second cutter elements primarily cut the corresponding portion of the desired configuration with shear in the range of zero to negative.

The first pair of cutter elements each may have a hook angle in the range of approximately 5° to 15° and a shear angle in the range of approximately 20° to 30°, and the second pair of cutter elements may each have a hook angle in the range of approximately 15° to 25° and a shear angle in the range of approximately 0° to −30°.

In accordance with another aspect of the present invention, the router bit may include a pair of relatively large cutter elements each having a hook angle and a positive shear angle and a pair of relatively smaller cutter elements, each having a hook angle and a shear angle in a range from zero to negative. The router bit may include a guide arrangement for guiding the workpiece in relation to the large cutter elements and the small cutter elements.

The present invention also provides a method of cutting a predetermined configuration in a workpiece, with the configuration including a first portion extending generally parallel to a major surface of the workpiece and a second portion connected with said first portion and extending generally perpendicular to the major surface of the workpiece. The method of the present invention includes the steps of providing a router bit and rotating the router bit about its axis of rotation, positioning a first pair of cutter elements on the body portion of the router bit to travel in a predetermined path about the axis which will cut the first portion of the configuration, and positioning a second pair of cutter elements to travel in a predetermined path about the axis that will cut the second portion of the configuration. The method further includes guiding the workpiece against the cutter elements so that the configuration is cut in the workpiece. The step of rotating the router bit may include rotating the bit at a speed in the range of approximately 8,000 to 24,000 rpm, and at a power in the range of approximately 1 to 3.25 horsepower.

Accordingly, the present invention provides a router bit and method for cutting predetermined configurations in a workpiece and has a pair of cutter elements advantageously oriented for making cuts in a radially extending direction, and another pair of cutter elements advantageously oriented for making cuts in a longitudinally extending direction. The invention thus provides for accurate and precise cutting of predetermined configurations, while leaving a smooth cut surface in the workpiece.

DESCRIPTION OF THE PREFERRED EMBODIMENT

Figure 1:
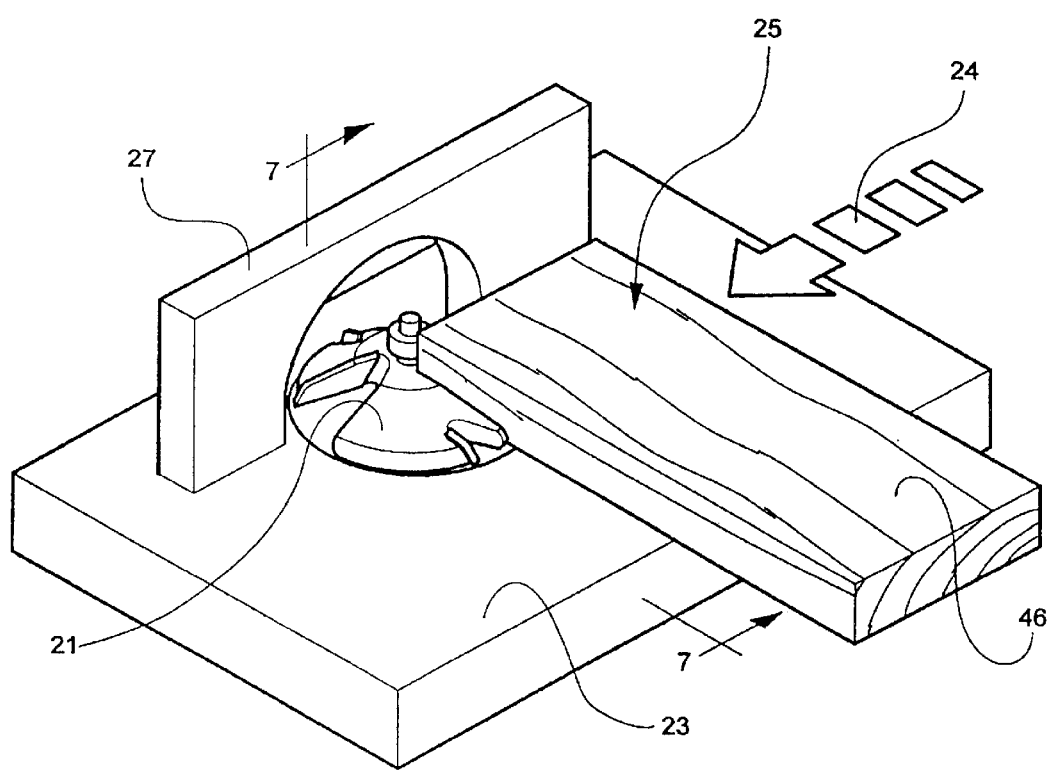
FIG. 1 is a perspective view illustrating the router bit of the present invention mounted in a routing machine for cutting of a workpiece.

Looking now in greater detail at the accompanying drawings, FIG. 1 illustrates in perspective view the router bit 21 of the present invention mounted in a routing machine (see FIG. 7) positioned in a router table 23 for cutting or routing of a configuration in wooden workpiece 25. The router table 23 includes fence 27 which assists in properly positioning the workpiece 25 in relation to the router bit 21 as the workpiece 25 is moved in the direction indicated by arrow 24 for cutting of the configuration.

Figure 2:
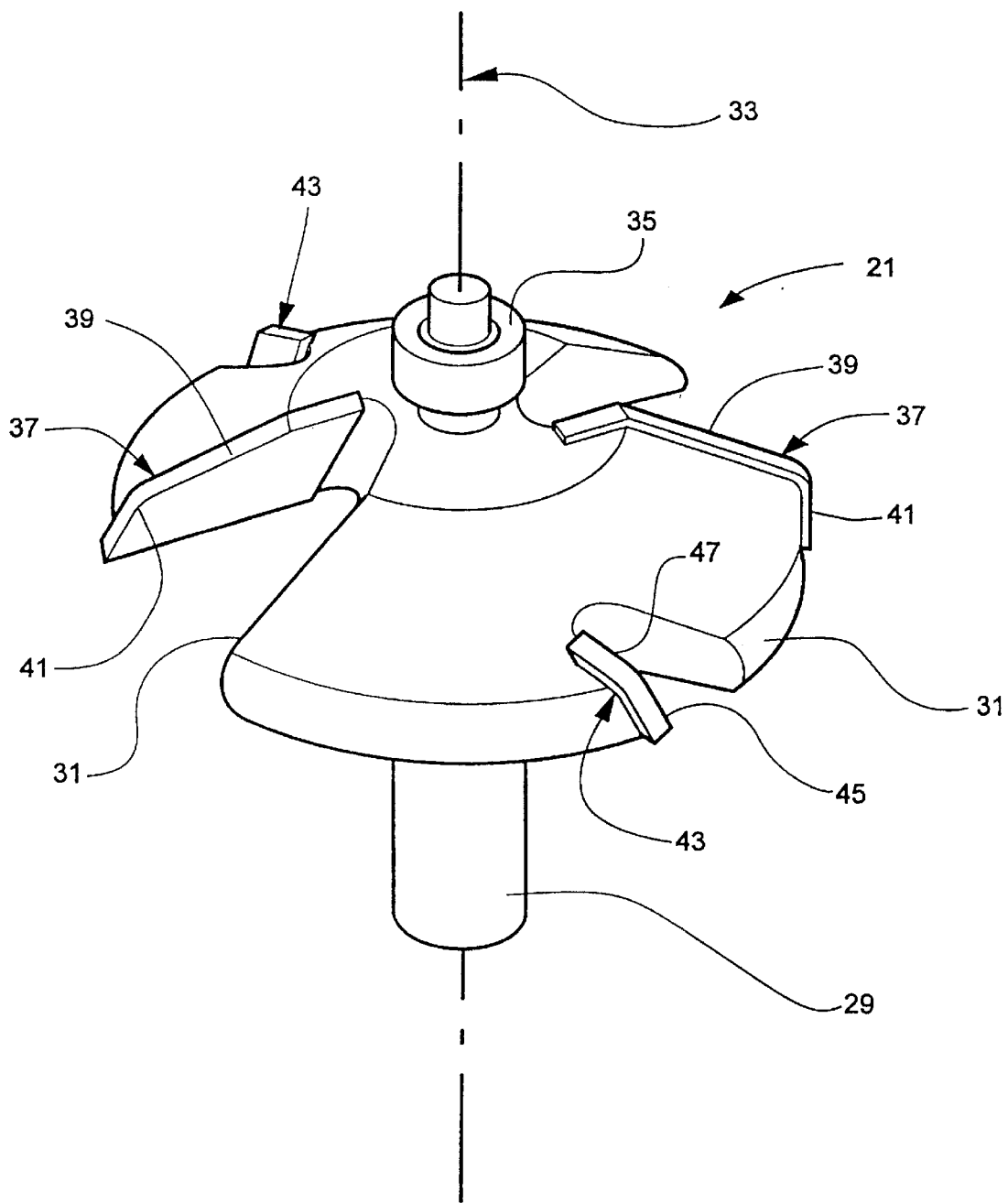
FIG. 2 is a perspective view of the router bit of the present invention.

FIG. 2 shows the router bit 21 of the present invention with a shank 29 formed integrally with a body portion 31, which has an axis of rotation 33 which is coaxial with the shank 29. As can be seen, the body portion 31 has a radial extent about the axis 33 and an axial extent which extends generally parallel to the axis 33. A conventional pilot or guide roller bearing 35 is at the upper side of the body portion 31 for rotation relative thereto.

Figure 3:
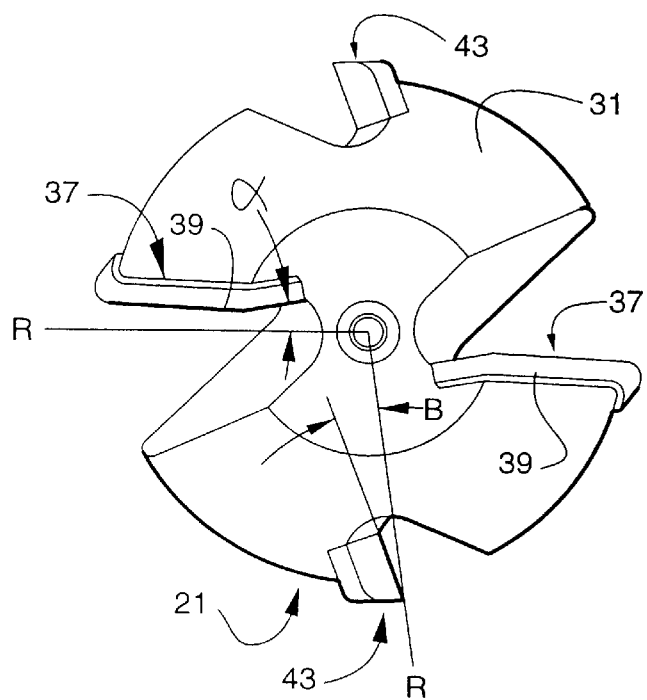
FIG. 3 is a plan view of the router bit of FIG. 2.

A pair of relatively larger cutter elements 37 are fixed in body portion 31 in generally diametrically opposed relation, as best seen in FIG. 3. Cutter elements 37 include generally radially extending cutting edge portions 39 and generally axially extending cutting edge portions 41, as seen in FIG. 2.

Looking again at FIGS. 2 and 3, a pair of relatively smaller cutter elements 43 are mounted in generally diametrically opposed relation and are spaced about the circumference of the body 31 from the cutter elements 37. The spacing of cutter elements 37, 43 about the aforementioned circumference of the body 31 is configured so as to assist in balancing the weight of router bit 21 in all radial directions. The cutter elements 43 have generally axially extending cutting edge portions 45 and generally radially extending cutting edge portions 47.

As seen in FIG. 3, cutter elements 37, 43 are mounted on the body portion 31 so as to be disposed at a hook angle formed, as is well-known in the art, by projecting lines 38', 40' from and aligned with the upper radial faces 38, 40 of the respective cutter elements 37, 43 out to a circle 42 formed about the axis 33 by the radially outermost portions of the cutter elements 37, 43. From the points at which the lines 38', 40' intersect the circle 42, respective radii R are projected back to the axis 33. The respective hook angle is determined by the angular relation of the lines 38', 40' with the respective radii R. The cutter elements 37 are positioned at a hook angle of α, while the cutter elements 43 are positioned at a larger hook angle of β.

Figure 4:
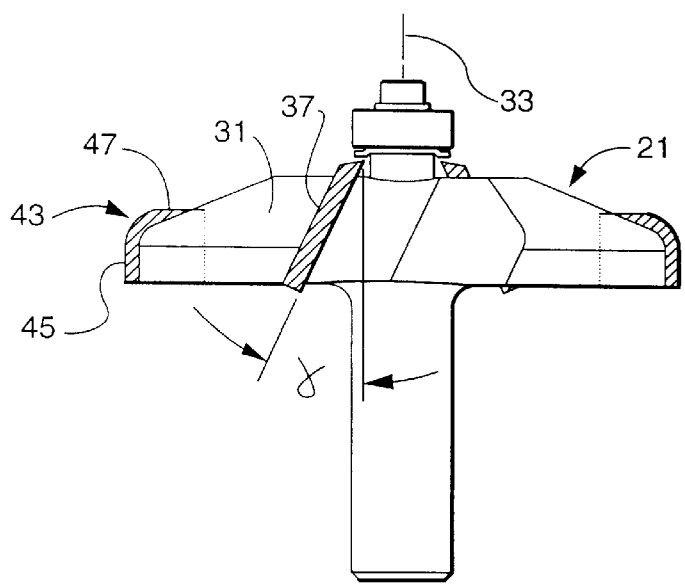
FIG. 4 is a side elevational view of the router bit of FIG. 2, illustrating the shear angle of a cutter element.
Figure 5:
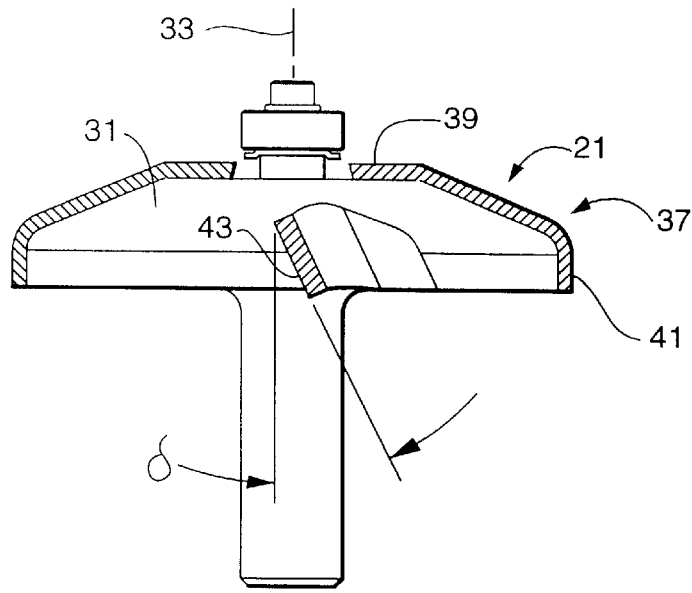
FIG. 5 is a side elevational view of the router bit of FIG. 2, illustrating the shear angle of another cutter element.

FIG. 4 illustrates the orientation of the cutter element 37 on the body 31 in a side elevational view. The shear angle, or the angle of orientation of the cutter element 37 with respect to a line parallel to the axis 33, is depicted by angle γ, which is a positive shear angle. FIG. 5 illustrates the negative shear angle δ at which the cutter element 43 is positioned on the body 31.

A cutter element oriented at a positive shear angle, such as cutter element 37, slopes from the upper part of the respective cutter element downwardly opposite to the direction of rotation of the router bit 21, which is indicated by arrow 44. A cutter element oriented at a negative shear angle, such as cutter element 43, slopes from the upper part of the respective cutter element downwardly and in the direction of rotation shown by the arrow 44, and a cutter element oriented at a shear angle of zero degrees extends parallel to the axis 33.

Figure 6:
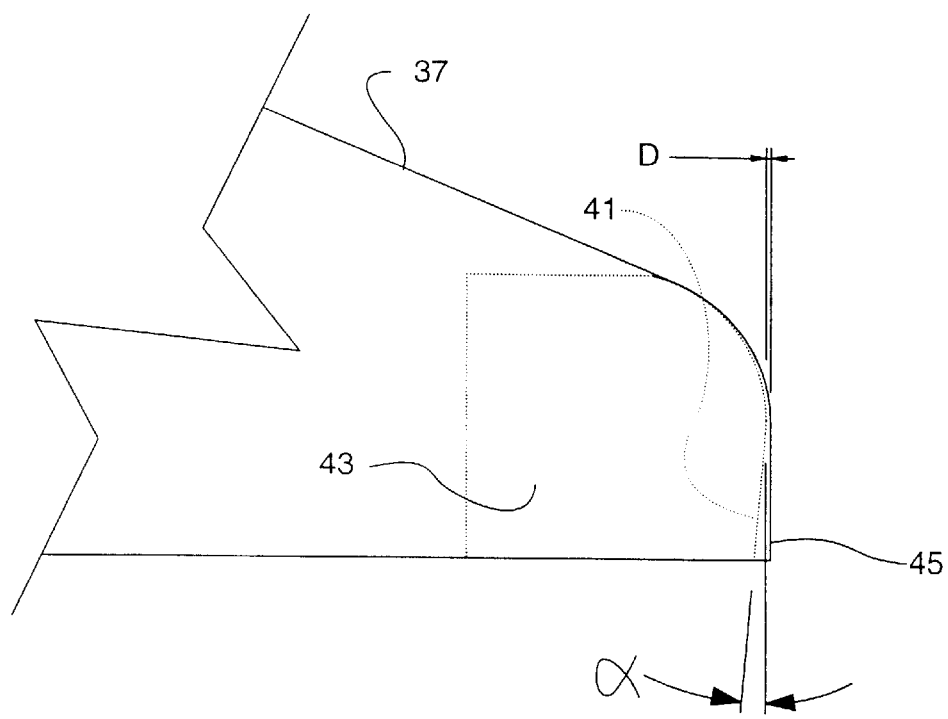
FIG. 6 is a detail view of the radially outermost extent of two cutter elements.

FIG. 6 illustrates the relative positions of the cutter element 43 and the radially outermost portion of the cutter element 37 (shown in broken lines). The generally axially extending cutting edge 45 on cutter element 43 extends radially outward further than the cutter element 37 by a distance shown as D. In addition, the generally axially extending cutting edge 41 of cutter element 37 slopes back from its radially outermost point at an angle θ in relation to cutting edge portion 45 of the cutter element 37. Preferably, distance D is 0.15 millimeters and angle θ is 5°, although other distances and angles are within the scope of the present invention.

Figure 7:
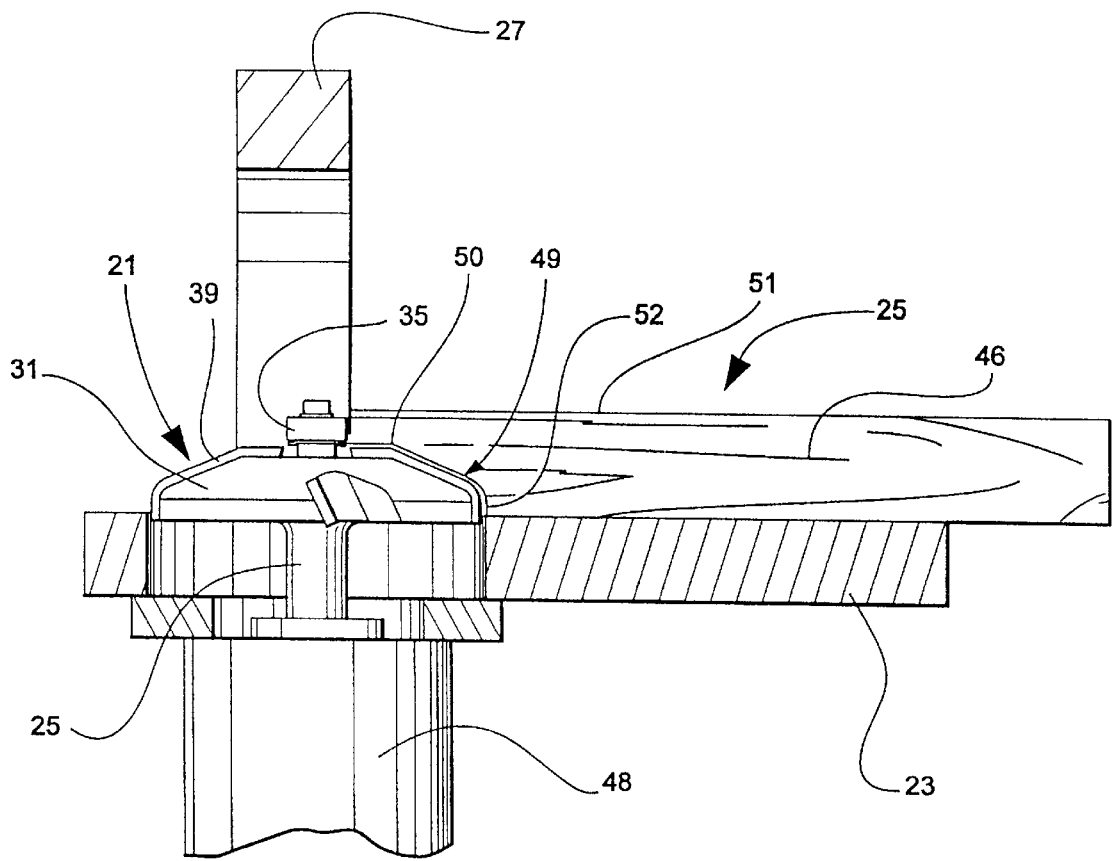
FIG. 7 is a diagrammatic cross-sectional view of the router bit of the present invention mounted in a routing machine shown in use during cutting of a configuration in a workpiece.

In operation, the router bit 21 is, as described above, positioned in the router table 23 for cutting the workpiece 25. FIG. 7 illustrates in a diagrammatic cross-sectional view the securing of the lower portion of the shank 29 in routing machine 48 and the positioning of router bit body 31 with respect to the router table 23, the fence 27, and the workpiece 25. The routing machine 48 may be a conventional router or any other appropriate machine which is capable of sufficiently driving the router bit rotationally about its axis. Routers typically have a horsepower of approximately 1 to 3.25 hp, and rotate at a speed of approximately 8,000 to 24,000 rpm, but it will be appreciated that the present invention is adaptable to use in many types of machines capable of mounting and driving router bits.

The grain 46 of the wood workpiece 25 is oriented generally perpendicular to the fence 27, which results in end grain being presented to the router bit 21 for cutting of a predetermined configuration 49 therein. While the router bit 21 of the present invention enjoys particularly unique and desirable results in cutting end grain, as shown in FIG. 7, it should also be noted that the present invention can cut wooden workpieces having other grain orientations and can also cut non-wooden workpieces as well.

The terms upper, lower, and downwardly are used herein for convenience to describe various aspects of the router bit 21 of the present invention, but should not be taken to limit the orientation of the present invention to a particular positioning. Rather, the lower portion of the shank 29 of the router bit 21 will be mounted in the routing machine 48 with the upper part of the router bit 21 extending outwardly therefrom, and the routing machine 48 itself can be positioned as shown in FIG. 7, or in other orientations as desired.

Guide roller bearing 35 assists in maintaining the workpiece 25 at an appropriate position with respect to the router bit 21 by providing a surface against which a portion of the workpiece 25 can bear, thereby preventing the workpiece 25 from passing over the top of the router bit 21 and providing for a uniformly and correctly configured cut profile. A solid pilot pin or other form of guide could also be used in place of guide bearing 35, and while the use of the guide bearing 35 and the fence 27 together provides for enhanced safety and accuracy, the workpiece can be guided by the guide bearing 35 alone.

Cutter elements 37, 43, as seen in FIG. 7, cut the predetermined configuration 49 in the workpiece 25 through high speed rotation of the router bit 21. The predetermined configuration 49 may take many forms without departing from the scope of the present invention, and may include linear and/or curved portions which may be joined in angular relation or through connecting arc segments. Generally radially extending cutting edge portion 39 of cutter element 37 cuts a section 50 of configuration 49 which extends generally parallel to the major surface 51 of the workpiece 25, while generally axially extending cutting edge portion 45 of cutter element 43 (see FIG. 2) cuts a section 52 of configuration 49 which extends generally perpendicular to the major surface 51 or across the thickness of the workpiece 25, which in the orientation shown in FIG. 7 requires this cut to be made across the end grain of workpiece 25.

The advantages of the present invention are realized by orienting cutter elements 37, 43 so that they can optimally cut different portions of the configuration 49. In particular, each of the relatively smaller cutter elements 43 is oriented, as seen in FIG. 5, with a negative shear angle δ, which allows the generally axially extending cutting edge portion 45 of cutter element 43 to accurately and smoothly cut the section 52 of the configuration 49 in the workpiece 25. Additionally cutter elements 37, 43 are oriented with respect to each other so that cutting edge portion 39 of the cutter element 37 primarily cuts the section 50 of configuration 49 which extends generally radially with respect to the router bit 21, while cutting edge portion 45 of the cutter element 43 primarily cuts the section 52 of configuration 49 which extends generally axially with respect to the router bit 21. There may be overlap in the portions of the configuration 49 cut by cutter elements 37, 43, however, without departing from the scope of the present invention.

The cutting edge portion 45 of the cutter element 43 extends further radially outward than any portion of the cutter element 37, as shown in FIG. 6, which allows the negative shear of the cutter element 43 and cutting edge portion 45 to be used to its greatest advantage in cutting the corresponding section 52 of the configuration 49 by preventing cutter element 37 from contacting the surface of the finished cut within the section 52.

The use of a shear angle in the range from zero to negative for the cutter element 43 imparts a "slicing" action to the cutting edge portion 45 in operation and permits it to reduce splintering and to leave a smooth cut surface, free of fuzz or other undesirable characteristics, on the corresponding portion of the cut configuration 49. It has also been found that the performance of the router bit 21 is enhanced by providing the cutter elements 43, with a greater positive hook angle than the cutter elements 37, and it is believed that improved working efficiency and performance are realized by providing the cutting elements 37 with a hook angle in the range of approximately 5° to 15° and a shear angle in the range of approximately 20° to 30° and providing the cutter elements 43 with a hook angle in the range of approximately 15° to 25° and a shear angle in the range of approximately 0° to −30°. Overall performance is believed to be optimized by providing the cutter elements 37 with a hook angle of approximately 8° and a shear angle of approximately 25° and providing the cutter elements 43 with a hook angle of approximately 20° and a shear angle of approximately −25°. Some variation in these angles is acceptable in typical applications, however, and will not deprive the present invention of its beneficial characteristics and advantages, and such variations would still be within the scope of the invention.

The present invention's use of a negative or zero shear angle for the cutter elements 43, which are relatively smaller than the cutter elements 37 also avoids known problems experienced with negative shear angle cutters. A negative shear angle generally increases cutting resistance for the cutting element involved and tends to cause the workpiece to be pushed away from the router bit or cutting tool. By providing for the use of a negative shear angle on the relatively small cutter elements 43, but not in the relatively larger cutter elements 37, the present invention minimizes the known problems with negative shear, yet is able to take advantage of the superior cutting characteristics for negative shear angle cutters, including the ability to smoothly cut difficult grain configurations such as end grain, among others.

The router bit of the present invention thus can be used for accurate cutting of configurations in a workpiece, including the end faces thereof, with the resulting cut surfaces having a smooth appearance and feel. The present invention thus brings to router bit users a high level of quality and precision in cutting desired configurations.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A router bit for use in a routing machine for cutting predetermined configurations in a workpiece, comprising:

a body portion having an axis of rotation, a radial extent about said axis, and an axial extent;

a shank member for retaining engagement in the rotating machine, said shank member extending generally along said axis and being formed integrally with said body portion;

a first pair of cutter elements mounted on said body in generally diametrically opposed relation to each other, said first pair of cutter elements each having a cutting edge extending generally radially;

a second pair of cutter elements mounted on said body in generally diametrically opposed relation to each other and circumferentially spaced from said first pair of cutter elements, said second pair of cutter elements each having a cutting edge extending generally axially;

said first pair of cutter elements each having a hook angle in the range of approximately 5° to 15° and a positive shear angle in the range of approximately 20° to 30°; and said second pair of cutter elements each having a hook angle in the range of approximately 15° to 25° and a shear angle in the range of approximately 0° to −30°.

2. The router bit of claim 1, wherein said hook angle of each of said first pair of cutter elements is positive, and said hook angle of each of said second pair of cutter elements is positive and greater than said hook angle of said first cutter elements.

3. The router bit of claim 1, wherein said first pair of cutter elements each have a generally axially extending cutting edge portion.

4. The router bit of claim 1, wherein said generally axially extending cutting edge portions of said second pair of cutter elements are each positioned further radially outward than said first pair of cutter elements.

5. The router bit of claim 4, wherein said generally axially extending cutting edges on said second pair of cutter elements extend radially outward 0.15 millimeters further than said first pair of cutter elements.

6. The router bit of claim 3, wherein said generally axially extending cutting edge portions of said first pair of cutter elements each have a radially outermost point and a radially inward portion sloping radially inwardly from said outermost point along a predetermined contour.

7. The router bit of claim 1, further including guide means for guiding the workpiece in relation to said first pair of cutter elements and said second pair of cutter elements.

8. The router bit of claim 1, wherein each of said first pair of cutter elements is relatively larger than each of said second pair of cutter elements.

9. The router bit of claim 7, wherein said first pair of cutter elements each have a hook angle of approximately 10° and a shear angle of approximately 25°, and said second pair of cutter elements each have a hook angle of approximately 20° and a shear angle of approximately −25°.

10. A router bit for use in a routing machine for cutting predetermined configurations in a workpiece, comprising:

body portion having an axis of rotation, a radial extent about said axis, and an axial extent;

a shank member for retaining engagement in the rotating machine said shank member extending generally along said axis and being formed integrally with said body portion;

a pair of relatively large cutter elements mounted on said body in generally diametrically opposed relation to each other;

a pair of relatively small cutter elements mounted on said body in generally diametrically opposed relation to each other and circumferentially spaced from said relatively large cutter elements, said relatively small cutter elements each having a generally axially extending cutting edge portion;

said relatively large cutter elements each having a hook angle and a positive shear angle; and said relatively small cutter elements each having a hook angle and a shear angle in a range from zero to negative.

11. The router bit of claim 10, wherein said hook angle of each of said relatively large cutter elements is positive, and said hook angle of each of said relatively small cutter elements is positive and greater than said hook angle of said relatively large cutter elements.

12. The router bit of claim 10, wherein said relatively large cutter elements each have a generally radially extending cutting edge portion.

13. The router bit of claim 10, wherein said relatively large cutter elements each have a generally axially extending cutting edge portion.

14. The router bit of claim 1, wherein said relatively small cutter elements extend radially outward from said axis further than said relatively large cutter elements.

15. The router bit of claim 1, wherein said generally axially extending cutting edges on said relatively small cutter elements extend radially outward 0.15 millimeters further than said relatively large cutter elements.

16. The router bit of claim 12, wherein said generally axially extending cutting edge portions of said relatively large cutter elements each have a radially outermost point and a radially inward portion sloping radially inwardly from said outermost point along a predetermined contour.

17. The router bit of claim 1, further including means for guiding the workpiece in relation to said large cutter elements and said cutter elements.

18. The router bit of claim 10, wherein said relatively large cutter elements each have a hook angle in the range of approximately 5° to 15° and a shear angle in the range of approximately 20° to 30°, and said relatively small cutter elements each have a hook angle in the range of approximately 15° to 25° and a shear angle in the range of approximately 0° to −30°.

19. The router bit of claim 10, wherein said relatively large cutter elements each have a hook angle of approximately 10° and a shear angle of approximately 25°, and said relatively small cutter elements each have a hook angle of approximately 20° and a shear angle of approximately −25°.

20. A method of cutting a predetermined configuration in a workpiece with a router tool, the configuration including a first portion extending generally parallel to a major surface of the workpiece and a second portion connected with said first portion and extending generally perpendicular to the major surface of the workpiece, the method comprising the steps of:

providing a router bit having an axis of rotation and a body portion having a radial extent about the axis;

rotating the router bit about the axis of rotation;

positioning a first pair of cutter elements on the body portion to travel in a perpendicular path about the axis that will cut the first portion of the configuration;

positioning a second pair of cutter elements on the body portion circumferentially spaced from the first pair of cutter elements and to travel in a predetermined path about the axis that will cut the second portion of the configuration; and guiding the workpiece against the cutter elements for cutting of the configuration in the workpiece.

21. The method of claim 20, wherein the step of positioning the second pair of cutter elements includes orienting the second pair of cutter elements with a shear angle in a range from zero to negative.

22. The method of claim 20, wherein the step of positioning the first pair of cutter elements includes orienting the first pair of cutter elements with a positive hook angle and a positive shear angle, and the step of positioning the second pair of cutter elements includes orienting the second pair of cutter elements with a positive hook angle .

23. The method of claim 20, wherein the router bit is rotated at a speed in the range of approximately 8,000 to 24,000 rpm.

24. The method of claim 20, wherein the router bit is rotated with a power in the range of approximately 1.0 to 3.25 horsepower.

* * * * *